United States Patent [19]

Glass et al.

[11] Patent Number: 4,514,428

[45] Date of Patent: Apr. 30, 1985

[54] CRISP APPLE SNACK AND PROCESS FOR MAKING SAME

[75] Inventors: Richard W. Glass, College Station; Dennis W. Koerner, Bedford, both of Tex.

[73] Assignee: Frito-Lay, Inc., Dallas, Tex.

[21] Appl. No.: 484,488

[22] Filed: Apr. 13, 1983

[51] Int. Cl.$^3$ .................... A23L 3/34; A23L 1/212
[52] U.S. Cl. .................... 426/321; 426/639; 426/640; 426/457
[58] Field of Search ............... 426/321, 615, 323, 639, 426/640, 518, 457, 484

[56] References Cited

U.S. PATENT DOCUMENTS

| | | |
|---|---|---|
| 144,592 | 11/1973 | Barbee . |
| 683,112 | 9/1901 | Gaines . |
| 1,393,540 | 10/1921 | Kelly . |
| 2,420,517 | 5/1947 | Brandner et al. ............... 34/9 |
| 2,536,176 | 1/1951 | Harriss ............... 426/518 |
| 2,541,859 | 2/1951 | Callaghan et al. ............... 426/640 |
| 3,134,683 | 5/1964 | Holohan et al. ............... 99/204 |
| 3,174,869 | 3/1965 | Roberts et al. ............... 99/204 |
| 3,365,309 | 1/1968 | Pader et al. ............... 99/204 |
| 3,384,496 | 5/1968 | Robinson et al. ............... 99/204 |
| 3,833,747 | 9/1974 | Cording et al. ............... 426/289 |
| 3,931,434 | 1/1976 | Murai ............... 426/295 |
| 3,962,355 | 6/1976 | Yamazaki et al. ............... 426/639 |
| 3,998,977 | 12/1976 | Rabeler ............... 426/144 |
| 4,055,675 | 10/1977 | Popper et al. ............... 426/470 |

FOREIGN PATENT DOCUMENTS 860263  1/1971  Canada ............... 99/173

*Primary Examiner*—Raymond Jones
*Assistant Examiner*—Elizabeth C. Weimar
*Attorney, Agent, or Firm*—Bernard, Rothwell & Brown

[57] ABSTRACT

A crisp apple wafer-shaped snack is made from apples which are thinly sliced, exposing the seeds. The seeds are removed by washing, the slices are treated to prevent browning and are steeped in a sugar solution. Then the slices are rapidly dried, in thirty minutes or less, to form a crisp delicious snack which may include the apple peel as well as the carpels in which the seeds were contained.

10 Claims, 1 Drawing Figure

U.S. Patent     Apr. 30, 1985     4,514,428
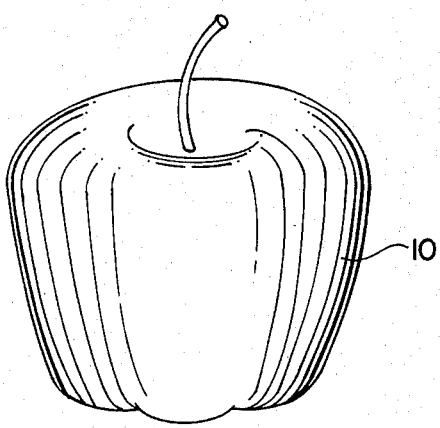
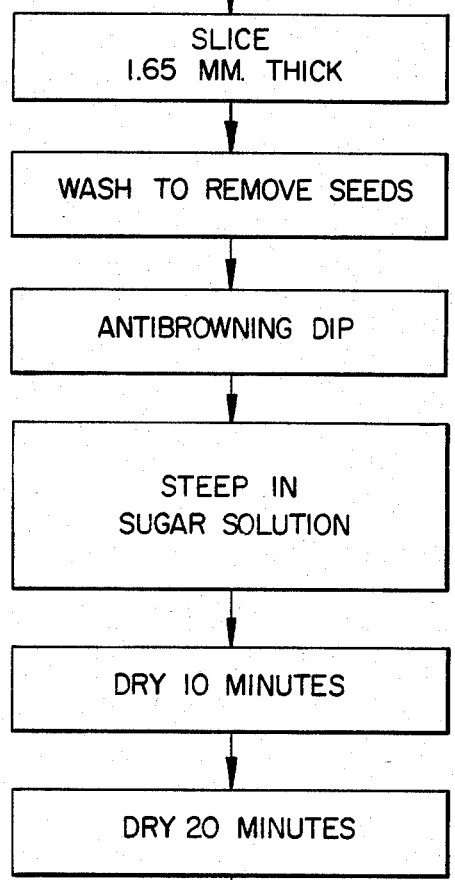
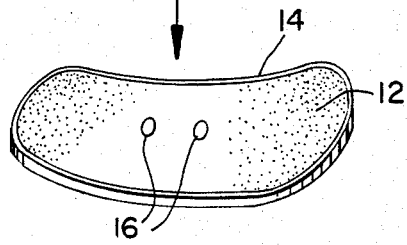

CRISP APPLE SNACK AND PROCESS FOR MAKING SAME

BACKGROUND OF THE INVENTION

1. Field of the Invention

The present invention relates to thin crisp apple slice snacks and a unique method of making them.

2. Prior Art

The prior potential art contains several processes for forming apple snacks.

One process is described in U.S. Pat. No. 3,384,496 wherein apples are cored and thinly sliced (0.07–0.25 inches thickness; Example I—0.0625 inches thickness) to form slices which are subsequently dipped in an aqueous solution containing 2% sulfite to prevent browning, dipped in a dry mixture of 98% sugar and 2% cinnamon and then dried at 300° F. by hot dry air flow at 300 to 700 linear feet per minute for 25 minutes to form curled crisp slices having a moisture content between about 0.8 and 3%.

In another process as described in U.S. Pat. No. 3,962,355, apple pieces (5 mm thickness) are set in a 30%–40% sugar solution at 65°–90° C. for 15–20 minutes, dried to a moisture content of 6–8% in a hot air dryer at 70° C., fried in oil, and expanded by vacuum to produce a porous hardened snack.

In a process described in U.S. Pat. No. 3,833,747 for producing crisp puffed apple pieces, hygroscopic monosaccharides such as levulose and dextrose are leached from cut apple segments by osmotic transfer in water; sucrose or other sugar of low hygroscopicity is substituted into the apple segments by osmotic transfer from a 40% sugar solution for 2 hours; and the segments are then partially dried, coated with an edible acid, puffed, and finally dried in a through-circulation air dryer at 150° F. to reduce the moisture content to 1.5%.

The prior known art processes for producing crisp apple snacks do not and cannot produce a crisp wafer-like snack rapidly and economically. They generally suffer from one or more deficiencies such as requiring a coring step for the apple, producing an undesired highly sugar sweetened product, using a frying step which results in oil in the product, requiring long soaking and drying procedures, or being deficient in flavor or texture of the product produced.

Additionally, the prior art contains processes for producing dried apple products which can be reconstituted into moist apple products by boiling or soaking in water. One such process is described in U.S. Pat. No. 3,365,309 wherein sliced apple segments (10–12 mm in diameter) are dipped in a sodium bisulfite solution for treating to prevent browning, are immersed in a circulated aqueous solution of crystallizing sugar such as a 67% sucrose solution for 45 minutes at 80° C. to produce a sugar uptake value of 1.0, and are dried in a hot air dryer at 150° F. for 16 hours to produce a rehydratable product containing 5.8% moisture.

Generally, the prior art processes for producing other products such as rehydratable dried apple chunks are unsuitable for producing crisp apple snacks since hygroscopy and rehydration properties are undesirable in crisp apple snacks and since such processes suffer from one or more deficiencies similar to the prior art processes for producing crisp apple snacks as noted above.

SUMMARY OF THE INVENTION

The invention crisp wafer-shaped apple snacks and a process for making them from whole apples in which apples are very thinly sliced, the seeds are removed by washing, the washed slices are treated with an anti-browning agent and are steeped in a sugar solution, and the steeped slices are then dried rapidly, i.e., in thirty minutes or less.

One advantage of the invention is that the combination of a thin slicing step, coupled with a subsequent seed removing step (by spray washing) eliminates the need for expensive coring steps to remove seeds from the snack.

Another advantage of the invention is that the combination of a sugar solution steeping step, together with a rapid drying step, (relative to the state of the art) results in a crisp apple slice snack having superior flavor and texture.

BRIEF DESCRIPTION OF THE DRAWING

The drawing is a flow diagram of the steps and alternative steps of the process of this invention.

DESCRIPTION OF THE PREFERRED EMBODIMENT(S)

A process for manufacturing an apple snack in accordance with the invention includes thinly slicing whole apples 10, washing the slices to remove seeds, treating the slices to prevent browning, steeping the treated slices in a sugar solution, and rapidly drying the slices to form crisp dried apple slices 12.

The steeping and anti-browning step can be combined into a single operation, or the washing, steeping, and anti-browning step can be combined in a single operation. The washing may be by spray washing or by washing by immersion either alone or combined with a following step. The apples 10 are preferably whole apples which have been washed but have not been cored or peeled. The apple chip 12 produced by the present process includes the peel 14 as well as the carpels 16 of the core. The peel and carpels 16 do not significantly detract from the texture and flavor of the crisp apple slices and the peel 14, particularly from a red apple, adds to the aesthetic appeal of the snack.

Any variety of edible apple may be used, such as Winesap, Rome, Jonathan, Delicious, etc. The slicing of the apple is performed using substantially similar techniques as that employed in the slicing of potatoes for forming potato chips, e.g., using a Urschel commercial slicer. The slices are made thin, generally from 0.040 to 0.120 inches thick with preference in the range of 0.050 to 0.085 inches thick depending upon the variety being processed. This results in the core being fully exposed. The slices may be either flat or rippled.

Washing of the slices to remove the seeds may be performed by spray washing or by washing in a bath. A spray wash has been found particularly effective to remove the seeds and is preferred. The washing is preferably performed by water, but it can be combined with the treating step where the solution for treating the slices to prevent browning is used to remove the seeds.

The treatment for preventing browning of apple slices may include dipping of the slices into a sulfite solution such as 1% sodium bisulfite solution for 15 seconds or a 0.5% solution for 5 minutes. Potassium bisulfite, sodium and potassium sulfite, and sodium and potassium metabisulfite solutions may also be used.

Additionally, nonsulfiting agents, such as certain organic and inorganic acids, including citric, malic, ascorbic, tartaric, lactic acids, may be used to prevent browning. With respect to the inorganic acids, the pH should be adjusted since polyphenol oxidase which is associated with browning is pH dependent. Other anti-browning procedures known in the art may be utilized as an alternative.

For instance, the addition of small amounts of sodium chloride has a limited effect, as does the addition of sulfhydryl compounds, such as the amino acid cysteine. Browning may also be retarded by oxygen removal, or by limiting enzyme activity through high temperature blanching.

Steeping of the apple slices in a sugar solution is performed at a relatively low temperature, generally within the range of 37° to 60° C. to avoid over-cooking the apple slices. The sugars which can be employed include sugars such as sucrose, dextrose, and suitable starch hydrolysates. Solution strengths may vary from 26% to 37.5% by weight with 33.3% being the preferred for sucrose. For corn syrup solids it can vary from about 30 to 54% by weight with 40% being preferred. Time within the solution for steeping generally will be from 3 to 10 minutes with about 5 minutes steeping time being especially preferred. The sugar impregnates the endogenous cellular structure of the apple slices to produce a sugar content in the final product within the range from about 25 to 35% on a dry weight basis. Additionally, the steeping solution may include an acid, such as citric acid, malic acid, ascorbic acid and/or other suitable organic acids to increase the tartness or otherwise modify the flavor of the finished product.

The apple slices are rapidly dried by any suitable means, e.g., in a programmable convection drying oven. Drying of stored apples may be carried out in two steps wherein the first step is performed at a relatively high temperature, for example in the range from 270° to 300° F. over a period of time from about 10 minutes (8-12 minute range). In a second step the temperature is reduced to within the range of about 200° to 240° F. and the drying is continued for another 20 minutes (15-25 minute range). During the drying, the apple slices are automatically turned by the conventional apparatus associated with the drying oven. The dried slices have a moisture content of about 0.75% to 3.0%. Fresh picked apples can be dried in one step at 270° to 300° F. for 30 minutes.

The relative short, 30 minutes or less drying time renders the process feasible for continuous processing to produce large quantities of the apple chips; long drying times of some prior art processes render such processes unsuitable for efficient mass production of apple snacks. Drying rate can be effected by air velocity. A spectrum of drying times ranging from 7 to 30 minutes can be obtained with air velocity ranging from 150-2000 fpm.

After drying, the slices are removed from the oven and allowed to cool whereupon they harden and form crisp tasty snacks which can be packaged and marketed similar to snacks such as potato chips or corn chips.

The combination of the rapid drying and the sugar impregnation during the short period of steeping particularly imparts a light texture and good taste to the then dried slices. Sufficient sugar is impregnated into the cellular structure of the apple slices to impart crispness to the product without producing a sugar or candy tasting product. The shortened drying time results in less baking and hardening and more porosity to produce the light texture as well as to preserve a desirable apple flavor.

EXAMPLE 1

In an example of forming an apple snack in accordance with the invention, washed Winesap apples are sliced on an Urschel potato slicer to a thickness of about 0.065 inches (1.65 mm). The slices are then vigorously sprayed with a wash water removing the seeds. After removing the seeds, the slices are dipped into a 1% bisulfite solution for a period of about 15 seconds. Then the chips are placed within an aqueous solution containing about 33% by weight sucrose and which is at a temperature of about 52° C. The slices are steeped for about 5 minutes in the sucrose solution. Then the slices are placed within a temperature programmed conventional hot air oven where they are exposed to convected hot air at 290° F. (143° C.) for 14 minutes. Then the temperature is reduced to 250° F. (121° C.) and the slices are further exposed to convected air for another 10 minutes. After removing the slices from the oven, they are cooled to form crisp tasty apple snacks. In a humid ambient environment refrigerated air may have to be used for cooling to prevent the product from taking up moisture.

Since many modifications, variations, and changes in detail may be made to the embodiment described above, it is intended that all manner in the foregoing description and shown in the accompanying drawings be interpreted as illustrative and not in a limiting sense. For example, although the preferred emobdiment utilizes apples without coring or peeling, cored and peeled apples could be used and will produce an acceptable product.

What is claimed is:

1. A process for preparing crisp wafer-shaped apple snacks comprising the steps of
   slicing whole apples to form slices having a thickness in the range from about 0.040 to 0.120 inches;
   washing the seeds from the slices;
   treating the washed slices with an anti-browning agent;
   steeping the treated slices in a sugar solution at a temperature of about 37°-60° C. for a period of about 3 to 10 minutes; and
   rapidly drying the steeped slices in less than 30 minutes at a temperature within the range of about 200° to 300° F.

2. A process as in claim 1 wherein the washing and treating for anti-browning are carried out in a single operation.

3. A process as in claim 1 wherein the washing, treating for anti-browning and steeping are carried out in a single operation.

4. A process for preparing a crisp apple slice snack as claimed in claim 1 wherein the washing step includes spray washing the slices to remove the seeds.

5. A process for preparing a crisp apple slice snack as claimed in claim 1 or 2 wherein the slicing step forms slices having a thickness in the range from about 0.050 to 0.085 inches.

6. A process for preparing a crisp apple slice snack as claimed in claim 5 wherein the drying step includes subjecting the steeped slices to a convection air flow at a temperature within the range from about 200° to 300° F. for less than 30 minutes.

7. In a process of treating sliced apples by anti-browning, steeping in a sugar solution and drying, the improvements in producing thin wafer-shaped crisp apple snacks which are consumable without rehydration comprising slicing the apples to a thickness of 0.040 to 0.120 inches and drying in less than 30 minutes.

8. An apple snack prepared by the process of claim 1.

9. An apple snack prepared by the process of claim 2.

10. An apple snack prepared by the process of claim 7.

* * * * *